(12) United States Patent
Su et al.

(10) Patent No.: US 12,118,884 B2
(45) Date of Patent: Oct. 15, 2024

(54) COOPERATIVE ARTIFICIAL INTELLIGENT ASSISTED DRIVING

(71) Applicant: TOYOTA MOTOR ENGINEERING & MANUFACTURING NORTH AMERICA, INC., Plano, TX (US)

(72) Inventors: Jianyu Su, Plano, TX (US); Rui Guo, Plano, TX (US); Ziran Wang, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 428 days.

(21) Appl. No.: 17/475,306

(22) Filed: Sep. 14, 2021

(65) Prior Publication Data
US 2023/0080946 A1     Mar. 16, 2023

(51) Int. Cl.
*G08G 1/0967* (2006.01)
*G06N 20/00* (2019.01)
*G08G 1/00* (2006.01)
*G08G 1/01* (2006.01)

(52) U.S. Cl.
CPC ....... *G08G 1/096725* (2013.01); *G06N 20/00* (2019.01); *G08G 1/0141* (2013.01); *G08G 1/0145* (2013.01); *G08G 1/20* (2013.01)

(58) Field of Classification Search
None
See application file for complete search history.

(56) References Cited

U.S. PATENT DOCUMENTS

| 10,977,551 B2 | 4/2021 | Van Seijen |
| 2010/0121503 A1* | 5/2010 | Sundqvist ............. G08G 5/045 701/532 |
| 2017/0276492 A1* | 9/2017 | Ramasamy ...... G08G 1/096758 |

(Continued)

FOREIGN PATENT DOCUMENTS

| CN | 111845741 | 10/2020 |
| EP | 3552904 | 10/2019 |
| EP | 3625731 | 3/2020 |

OTHER PUBLICATIONS

Chen et al., "Deep Multi-agent Reinforcement Learning for Highway On-Ramp Merging in Mixed Traffic," arXiv:2105.05701v1 [eess.SY] May 12, 2021.

(Continued)

*Primary Examiner* — James J Lee
*Assistant Examiner* — Melanie G Huber
(74) *Attorney, Agent, or Firm* — SHEPPARD, MULLIN, RICHTER & HAMPTON LLP; Daniel N. Yannuzzi

(57) ABSTRACT

Systems and methods of cooperative autonomous driving which maximize objectives of a global traffic environment are provided. In particular, a cooperative controller may control multiple connected vehicles within a traffic environment. In certain embodiments, the cooperative controller may assign each connected vehicle a traffic role, based in part on their situation within the traffic environment. In some embodiments, this traffic role may also be based on a "priority level" for the connected vehicle which corresponds to a desired travel time. Once traffic roles have been assigned, the cooperative controller may control each connected vehicle according to a driving policy associated with its assigned traffic role.

19 Claims, 5 Drawing Sheets

(56) References Cited

U.S. PATENT DOCUMENTS

| | | | | |
|---|---|---|---|---|
| 2018/0005527 A1* | 1/2018 | Bostick | ............... | G08G 1/0141 |
| 2018/0336780 A1* | 11/2018 | Ran | ..................... | G08G 1/0133 |
| 2019/0051159 A1* | 2/2019 | Wang | ................... | G05D 1/0088 |
| 2019/0250638 A1* | 8/2019 | Mueller | ........... | G08G 1/096816 |
| 2019/0266489 A1* | 8/2019 | Hu | ........................ | B60W 10/20 |
| 2020/0090074 A1* | 3/2020 | Isele | ..................... | G06N 20/00 |
| 2020/0150672 A1 | 5/2020 | Naghshvar | | |
| 2021/0074162 A1 | 3/2021 | Jafari Tafti | | |
| 2022/0177000 A1* | 6/2022 | Zadeh | .................. | B60W 50/06 |

OTHER PUBLICATIONS

Liao et al., "A Game Theory Based Ramp Merging Strategy for Connected and Automated Vehicles in the Mixed Traffic: A Unity-SUMO Integrated Platform," Transportation Research Board 100th Annual Meeting, 2021.

Ren et al., "Cooperative Highway Work Zone Merge Control based on Reinforcement Learning in A Connected and Automated Environment," Jul. 17, 2020.

Sequeira et al., "The Role of Machine Learning for Trajectory Prediction in Cooperative Driving," Proceedings of the Twenty-First International Symposium on Theory, Algorithmic Foundations, and Protocol Design for Mobile Networks and Mobile Computing, Oct. 2020.

Wang et al., "Autonomous Ramp Merge Maneuver Based on Reinforcement Learning with Continuous Action Space," California PATH, University of California, Berkeley, Mar. 25, 2018.

* cited by examiner

COOPERATIVE ARTIFICIAL INTELLIGENT ASSISTED DRIVING

TECHNICAL FIELD

The present disclosure relates generally to automotive systems and technologies, and more particularly, some embodiments relate to systems and methods of controlling multiple vehicles in a traffic environment.

DESCRIPTION OF RELATED ART

Non-cooperative autonomous driving systems are designed to respond to a traffic environment (e.g. relative movement and location of other vehicles/objects, road path and configuration, etc.) in a manner which maximizes objectives (e.g. safety and travel efficiency) for a single vehicle. However, in certain traffic environments, the objectives of a single vehicle may contradict the global objectives of the traffic environment (e.g. safety for all vehicles/pedestrians in the traffic environment and/or overall traffic flow efficiency).

BRIEF SUMMARY OF THE DISCLOSURE

According to various embodiments of the disclosed technology a method for cooperatively controlling one or more connected vehicles within a traffic segment is provided. The method, in accordance with embodiments of the technology disclosed herein comprises: (1) determining, by an electronic control unit (ECU), a traffic state for a traffic segment, the traffic state comprising information associated with one or more vehicles within the traffic segment; (2) assigning, by the ECU, a traffic role to one or more connected vehicles in the traffic segment; and (3) executing, by the ECU a driving maneuver for each connected vehicle according to a driving policy associated with the connected vehicle's traffic role. In some embodiments, the traffic state may comprise the location, speed, and priority level of each connected vehicle, and each priority level may correspond to a level of desired travel urgency for its associated connected vehicle. In certain embodiments, each driving policy associated with a traffic role may be refined using reinforcement learning.

In various embodiments, a vehicle system is provided. The vehicle system, in accordance with embodiments of the technology disclosed herein comprises: a processor; and a memory unit operatively connected to the processor and including computer code, that when executed, causes the processor to repeatedly perform the following method: (a) learning traffic-related behavior; (b) defining one or more traffic roles; (c) determining a traffic state for a traffic segment, the traffic state comprising information associated with one or more vehicles within the traffic segment; (d) assigning a traffic role to one or more ego vehicles, each ego vehicle being a connected vehicle within the traffic segment; (e) executing a driving maneuver for each ego vehicle according to a driving policy associated with the ego vehicle's traffic role; and (f) refining each driving policy based on reinforcement learning.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
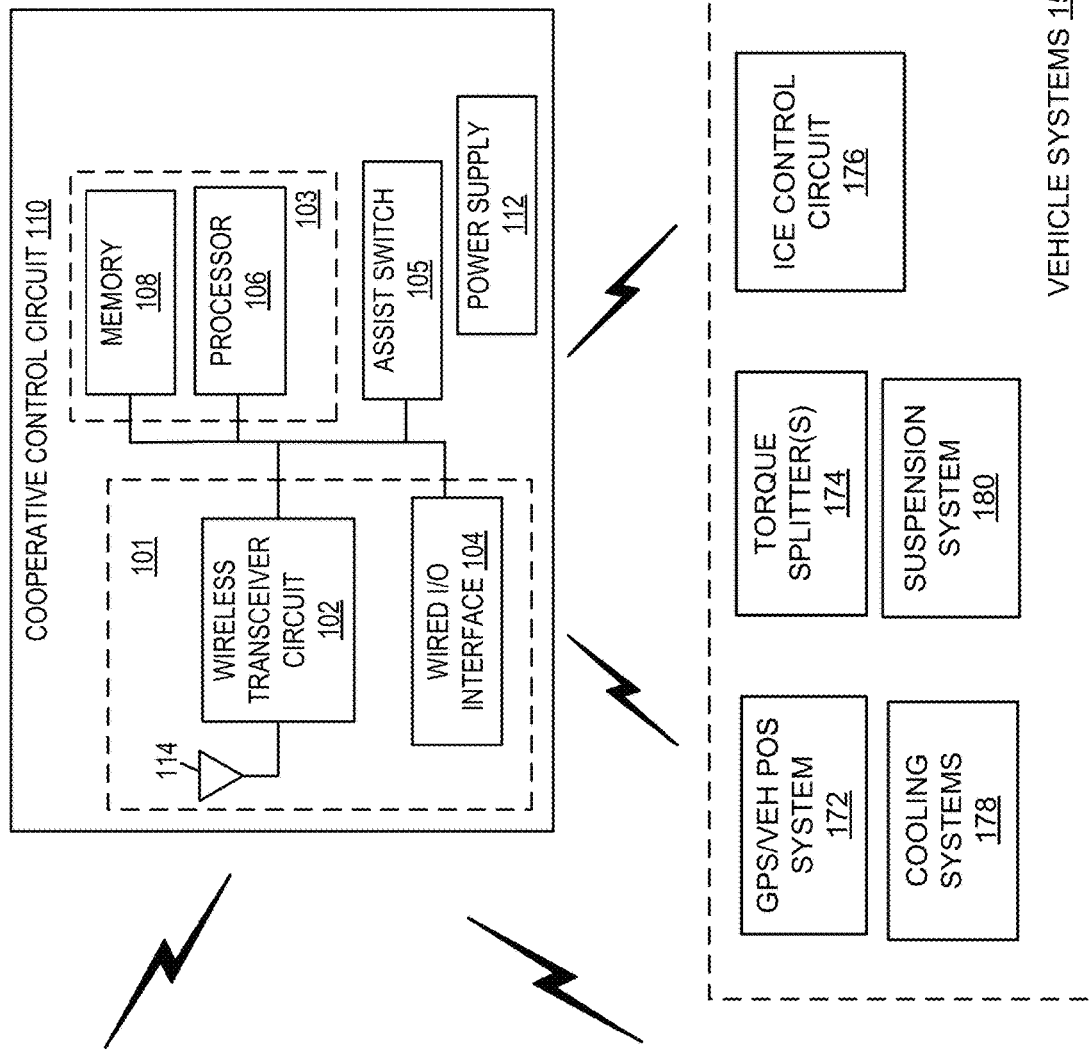
FIG. 1 illustrates an example architecture for controlling one or more connected vehicles, in accordance with one embodiment of the systems and methods described herein.
Figure 1:
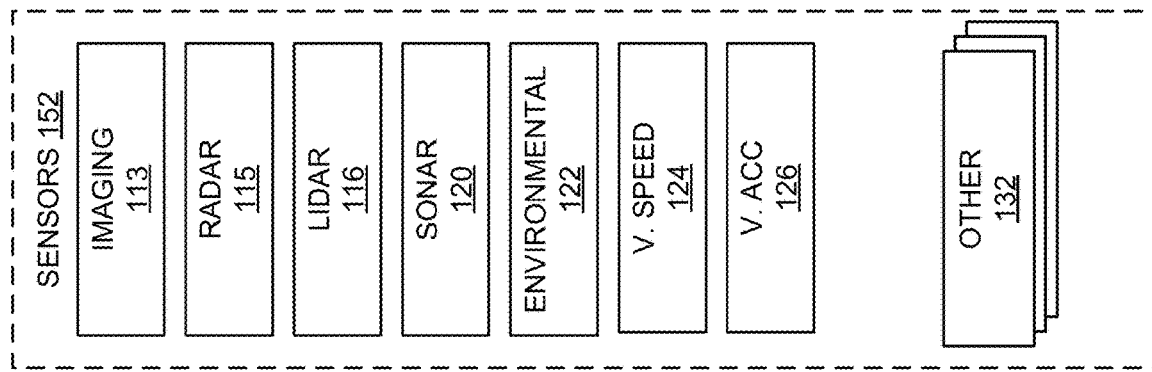

The figures are not exhaustive and do not limit the present disclosure to the precise form disclosed.

DETAILED DESCRIPTION

As alluded to above, non-cooperative autonomous driving systems are typically designed to maximize the objectives of a single vehicle. In certain traffic environments, the objectives of a single vehicle may contradict the objectives of global traffic flow. For example, in a highway exit ramp scenario, the travel efficiency of a single vehicle may be maximized by waiting until the last second to merge into an exit lane. Similarly, when merging onto the highway, the travel efficiency of a single vehicle may be optimized by maintaining its speed instead of slowing down to allow other vehicles to pass. However, by executing either of these driving maneuvers, the single vehicle (and the non-cooperative driving system controlling it) may reduce the overall travel efficiency of the traffic environment, as well as increase the likelihood of a crash.

Against this backdrop, embodiments of the technology disclosed herein are directed towards systems and methods of cooperative autonomous driving which maximize the objectives of a global traffic environment. In particular, a cooperative controller—which may be cloud-based, infrastructure-based, or even incorporated as an electronic control unit in a particular vehicle—can be used to control multiple connected vehicles within a traffic environment. In certain embodiments, the cooperative controller may assign each connected vehicle a traffic role, based in part on its situation within the traffic environment. In some embodiments, this traffic role may also be based on a "priority level" for the connected vehicle which corresponds to a desired travel time. Once traffic roles have been assigned, the cooperative controller may control each connected vehicle according to a driving policy associated with its assigned traffic role. Each role specific driving policy may be designed to cooperate with/complement other role specific policies. For example, a sports car merging onto a highway may be assigned to a traffic role for high agility vehicles merging onto a highway. A nearby cargo truck traveling on the highway may be assigned to a traffic role for low agility, slow moving vehicles which cannot easily change lanes. Accordingly, the driving policy for the sports car may dictate/determine that the sports car should accelerate ahead of the cargo truck to merge onto the highway. The driving policy for the cargo truck may dictate/determine that the cargo truck should remain in its lane, but slowdown slightly to allow the sports car to pass. By executing these driving maneuvers, the cooperative controller may increase the safety and efficiency of the traffic environment the two vehicles are traveling in. In this way, the cooperative controller may control multiple vehicles within a traffic environment with the objectives of increasing overall traffic efficiency and safety.

In various embodiments, the cooperative controller may leverage machine learning techniques in order to (1) define and assign traffic roles, and (2) refine the driving policy for each traffic role. For example, by observing traffic flow/behavior, the cooperative controller may learn that certain vehicles and/or vehicle types behave similarly. Accordingly, the cooperative controller may define traffic roles which categorize these learned behaviors. In certain embodiments, the cooperative controller may use K-Nearest Neighbors (KNN)—a machine learning technique which can be used for classification tasks—in order to define these traffic roles. Once defined, the cooperative controller may learn to assign a connected vehicle to an appropriate traffic role, and refine the driving policy associated with that traffic role. For example, in certain embodiments, reinforcement learning may be used. Reinforcement learning is a machine learning technique which may be used to teach an agent (such as the cooperative controller) to find an optimal policy. The optimal policy may be the policy which maximizes a reward function.

Using reinforcement learning, the cooperative controller may learn to assign traffic roles and refine driving policies in a manner which maximizes a reward function. A reward framework may be formulated which connects increasing traffic safety and efficiency to maximizing the reward function. For example, the cooperative controller may receive rewards for successful driving intervals (e.g. defined time intervals where the controller is controlling vehicles and there is no crash event) and improving traffic efficiency (e.g. reducing overall travel time for the traffic segment). Similarly, the cooperative controller may be punished for failed driving intervals (e.g. defined time intervals where one or more collisions occur or one or more instances occur where a dramatic driving maneuver is necessary to avoid a collision) and decreasing traffic efficiency. Accordingly, the cooperative controller may maximize the reward function by assigning vehicles to traffic roles, and refining the driving policies for those traffic roles, in a manner which increases the number of successful driving intervals and/or reduces travel time. In this way, the cooperative controller may learn to define/assign traffic roles and refine driving policies in a manner which increases global traffic safety and efficiency.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well, such as hybrid-electric vehicles, gasoline- or diesel-powered vehicles, fuel-cell vehicles, electric vehicles, or other vehicles.

FIG. 1 illustrates an example architecture for controlling one or more connected vehicles, in accordance with one embodiment of the systems and methods described herein. Referring now to FIG. 1, in this example, cooperative driving system 100 includes a cooperative driving circuit 110, and a plurality of sensors 152. Cooperative driving system 100 may be implemented in any number of ways. For example, cooperative driving system 100 may be implemented in a connected vehicle, in a piece of infrastructure (e.g. a traffic light, a tower situated near a highway entrance ramp, etc.) or even in the cloud. In embodiments where cooperative driving system 100 is implemented in a connected vehicle, cooperative driving system 100 may also include a plurality of vehicle systems 158.

Sensors 152 (and vehicle systems 158) can communicate with cooperative driving circuit 110 via a wired or wireless communication interface. Although sensors 152 and vehicle systems 158 are depicted as communicating with cooperative driving circuit 110, they can also communicate with each other as well as with other vehicle systems. Cooperative driving circuit 110 can be implemented as an automotive ECU, or as part of an automotive ECU. As alluded to above, cooperative driving circuit 110 can also be implemented independently of an automotive ECU.

Cooperative driving circuit 110 in this example includes a communication circuit 101, a decision circuit (including a processor 106 and memory 108 in this example) and a power supply 112. Components of cooperative driving circuit 110 are illustrated as communicating with each other via a data bus, although other communication in interfaces can be included. If cooperative driving system 100 is implemented as part of an automotive ECU, cooperative driving circuit 110 may include a manual assist switch 105 that can be operated by a driver to manually activate cooperative driving circuit 110.

Processor 106 can include a GPU, CPU, microprocessor, or any other suitable processing system. The memory 108 may include one or more various forms of memory or data storage (e.g., flash, RAM, etc.) that may be used to store the calibration parameters, images (analysis or historic), point parameters, instructions and variables for processor 106 as well as any other suitable information. Memory 108, can be made up of one or more modules of one or more different types of memory, and may be configured to store data and other information as well as operational instructions that may be used by the processor 106.

Although the example of FIG. 1 is illustrated using processor and memory circuitry, as described below with reference to circuits disclosed herein, decision circuit 103 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up cooperative driving circuit 110.

Communication circuit 101 may include either or both of a wireless transceiver circuit 102 with an associated antenna 114 and a wired I/O interface 104 with an associated hardwired data port (not illustrated). As this example illustrates, communications with cooperative driving circuit 110 can include either or both wired and wireless communication circuits 101. Wireless transceiver circuit 102 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Accordingly, wireless transceiver circuit 102 may be used to (1) send control signals to one or more connected vehicles within a traffic segment; and (2) receive traffic related information. In some embodiments, this received information may be in addition to information received from sensors 152.

Wired I/O interface 104 can include a transmitter and a receiver (not shown) for hardwired communications with other devices. For example, wired I/O interface 104 can provide a hardwired interface to other components, including sensors 152 and vehicle systems 158. Wired I/O interface 104 can communicate with other devices using Ethernet or any of a number of other wired communication protocols whether standardized, proprietary, open, point-to-point, networked or otherwise.

As alluded to above, when cooperative driving system 100 is implemented in a connected vehicle, cooperative driving circuit 110 may use V2X communication to communicate with other connected vehicles (V2V communications) or roadside units of a vehicle-to-infrastructure (V2I) communications system (both referred to as V2X communications). These communications can be received directly by cooperative driving circuit 110, another electronic control unit, or other communications component of the vehicle (and forwarded to cooperative driving circuit 110 via communication circuit 101).

Power supply 112 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 may include sensors which obtain traffic-related information for a particular traffic segment. For example, as alluded to above, sensors 152 may include imaging sensors (such as cameras), and proximity sensors (such as radar, lidar, and sonar) which may be used to detect the location/movement of vehicles, as well as the location/movement of pedestrians and other objects, such as debris in a road. Sensors 152 may also include environmental sensors which can detect ambient weather conditions.

As alluded to above, cooperative driving circuit 110 may obtain traffic-related information in other ways. For example, connected vehicles within a traffic segment may broadcast any one of their speed, location, and priority level to cooperative driving circuit 110. In some embodiments, connected vehicles within the traffic segment may obtain more general traffic-related information via their on-board sensors, and transmit it to cooperative driving circuit 110 wirelessly. Similarly, infrastructure-based sensors in proximity to a traffic segment may transmit traffic-related information to cooperative driving circuit 110.

In embodiments where cooperative driving system 100 is implemented in a connected vehicle, vehicle systems 158 can include any of a number of different vehicle components or subsystems used to control or monitor various aspects of the vehicle and its performance. In this example, the vehicle systems 158 include a GPS or other vehicle positioning system 172; torque splitters 174 that can control distribution of power among the vehicle wheels such as, for example, by controlling front/rear and left/right torque split; engine control circuits 176 to control the operation of engine (e.g. internal combustion engine 14); steering system 178 to turn the wheels of the vehicle; suspension system 180 such as, for example, an adjustable-height air suspension system, and other vehicle systems.

Regarding in-vehicle embodiments, communication circuit 101 can receive information from various vehicle sensors which can be used to determine which driving maneuver to execute for the connected vehicle. Additionally, communication circuit 101 can be used to send one or more control signals or other control information to various vehicle systems 158 as part of executing the driving maneuver. For example, communication circuit 101 can be used to send signals to, for example, one or more of: torque splitters 174 to control front/rear torque split and left/right torque split; ICE control circuit 176 to, for example, control motor torque, motor speed of the various motors in the system; and steering system 178 to, for example, increase lateral force. The decision regarding what action to take via these various vehicle systems 158 can be made based on the information detected by sensors 152. Examples of this are described in more detail below.

Figure 2:
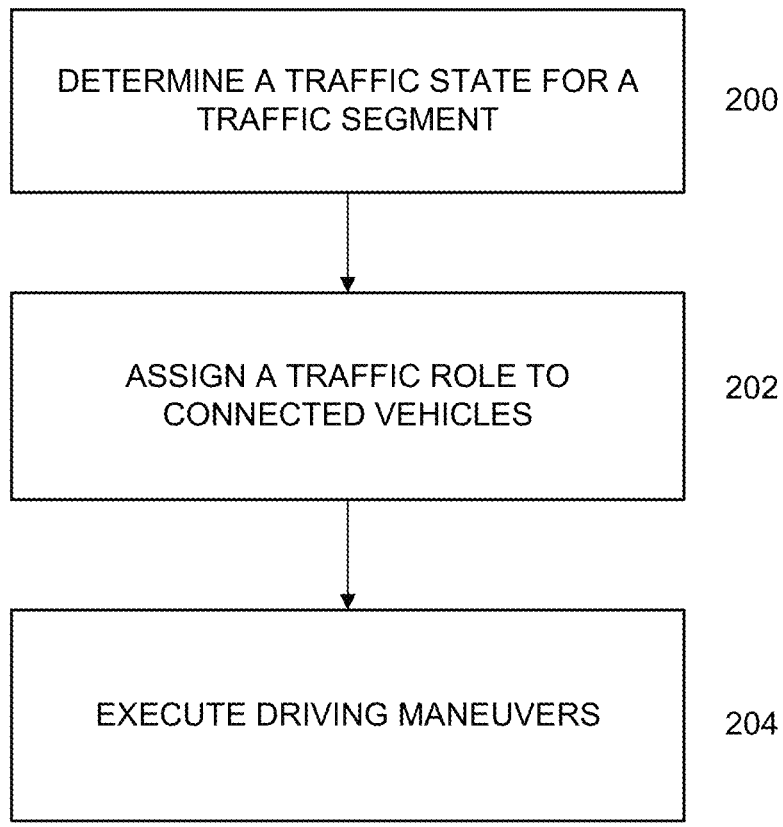
FIG. 2 is a flowchart illustrating example operations that can be performed by a cooperative controller to control one or more connected vehicles within a traffic segment.

FIG. 2 is a flowchart illustrating example operations that can be performed by a cooperative controller to control one or more connected vehicles within a traffic segment. In some embodiments, these operations may be performed by cooperative driving circuit 110.

At operation 200, a cooperative controller determines a traffic state for a traffic segment. As will be described in greater detail below, based on this traffic state, the cooperative controller may assign connected vehicles to traffic roles, and control those vehicles according to driving policies refined to maximize global traffic objectives such as increasing traffic safety and efficiency.

A traffic segment may be a section of roadway on which vehicles can travel. For example, a traffic segment may be a stretch of highway. A traffic segment may also be an intersection, or a busy stadium parking lot. It should be understood that traffic segments may have different sizes. For example, one traffic segment may be a 5-mile stretch of highway. Another traffic segment may be a 1-mile stretch of highway near a busy on-ramp, or a single intersection.

A traffic state may represent traffic-related information for a particular traffic segment. Traffic-related information may include any information which relates to the flow of traffic within the traffic segment. This may include information associated with road features (e.g. road path, number of lanes, geometries of intersections, etc.), vehicles (e.g. location, speed, vehicle type, priority level, etc.), pedestrians/objects (e.g. location, speed, object type, etc.) and other contextual information (e.g. phase of a traffic light, presence/significance of traffic signs, ambient weather conditions, etc.). A traffic state may also represent information related to travel time for vehicles in a traffic segment. This travel time may be represented as an average expected travel time for the vehicles within the traffic segment (e.g. mean travel time, median travel time, etc.) For example, the mean travel time for vehicles in the traffic segment may be 1 minute to travel 1 mile.

As alluded to above, traffic-related information may include a priority level associated with a vehicle. A priority level may be a hierarchical representation of a vehicle's urgency as it relates to desired travel time. For example, a first responder vehicle traveling to an emergency may have the highest priority level. Similarly, a civilian vehicle carrying a woman who is in labor may have a relatively high priority level. By contrast, a civilian vehicle carrying a driver to their in-laws' home may have a relatively low priority level. As alluded to above, a vehicle's priority level may be one factor which the cooperative controller considers when assigning the vehicle to a traffic role. By assigning vehicles to appropriate traffic roles, and controlling the vehicles in accordance with driving policies associated with their traffic roles, the cooperative controller may achieve global traffic objectives such as increasing traffic safety and efficiency.

In certain embodiments, a priority level for a vehicle may be selected/requested by a driver and/or passenger in the vehicle. For example, if a driver is in a rush, the driver may request a high priority level. In some embodiments, this may involve paying for the high priority level. Similarly, drivers may be provided incentives (e.g. points, money, etc.) to request low priority levels.

In some embodiments, the cooperative controller may determine priority level based on vehicle type. For example, the cooperative controller may learn to categorize first responder vehicles as high priority vehicles, and civilian vehicles as lower priority vehicles.

As alluded to above, the cooperative controller may receive traffic-related information from any number of sources. For example, the cooperative controller may receive traffic-related information from connected sensors, such as sensors 152, connected vehicles, or connected infrastructure.

In certain embodiments, the cooperative controller may determine the traffic state by encoding raw sensory information (i.e. the traffic-related information) it receives into a state representation. For example, if the cooperative controller detects a Toyota Prius traveling at 29.27 m.p.h., the cooperative controller may encode the Prius based on vehicle type and speed interval, e.g. [Commuter Sedan, (29-30 m.p.h.)].

At operation 202, the cooperative controller assigns a traffic role to one or more connected vehicles within the traffic segment. As alluded to above, the cooperative controller may assign vehicles to complementary/cooperative traffic roles with the goal of increasing traffic safety and efficiency. Accordingly, the cooperative controller may control each connected vehicle according to a driving policy associated with its traffic role. As will be described below, the assignment of traffic roles, and the driving policies associated with each traffic role, may be refined to maximize global traffic objectives such as increasing traffic safety and efficiency.

A traffic role may be a defined category which groups vehicles based on driving behavior. For example, there may be a traffic role for vehicles which tend to/prefer to maintain their speed on a highway. Accordingly, there may be another traffic role for vehicles which tend to/are amenable to slowing down for other vehicles to let them pass. Similarly, there may be different traffic roles for vehicles which tend to/prefer to remain in their lane as compared to vehicles which tend to/are amenable to changing lanes. In addition, there may be traffic roles for vehicles which by necessity, behave in a particular way. For example, vehicles traveling in the far left-lane of a highway may be assigned to a traffic role for vehicles which cannot merge left. Similarly, low agility vehicles like cargo trucks may be assigned to different traffic roles than high-agility vehicles like sports cars.

Accordingly, the cooperative controller may assign each connected vehicle to a traffic role based on a number of factors. These factors may include vehicle type (e.g. ambulance vs. cargo truck vs. sports car), a vehicle's relative position and movement within the traffic segment (e.g. a vehicle traveling 75 m.p.h. in the fast lane of a highway vs. a vehicle traveling 60 m.p.h. in a slow lane vs. a vehicle traveling 60 m.p.h. in a merge lane which ends in 50 feet), and priority level (e.g. high priority vs. low priority). As will be described below, the cooperative controller may learn to assign connected vehicles to complementary traffic roles in order to increase traffic safety and efficiency. For example, the cooperative controller may assign a sports car merging onto a highway to a traffic role for vehicles which prefer to accelerate to pass other vehicles. By contrast, the cooperative controller may assign a cargo truck immediately to the right of the sports car to a traffic role for vehicles which prefer to slow down slightly or maintain their speed in order to let other vehicles pass. By assigning these two vehicles to complementary/cooperative roles, the cooperative controller may control each vehicle according to complementary driving policies which dictate that the sports car will accelerate to pass the cargo truck. These driving maneuvers achieve global traffic goals by producing a safe outcome which does not result in a slowdown of traffic.

In some embodiments, the cooperative controller may learn to define traffic roles using various machine learning techniques. For example, the cooperative controller may observe traffic behavior within a traffic segment over a period of time. By observation, the cooperative controller may learn to cluster/group vehicles which behave similarly. In this way, the cooperative controller may learn to define traffic roles which describe these similar behavior clusters. As alluded to above, in some embodiments the cooperative controller may use K-Nearest Neighbors (KNN)—a machine learning technique which can be used for classification tasks—in order to define these traffic roles.

In certain embodiments, each traffic role may have an associated maneuver space. The maneuver space may define the permissible driving maneuvers for a connected vehicle assigned to the traffic role. For example, if a connected vehicle has been assigned to a traffic role for vehicles in the far left lane of a highway, the maneuver space may include maintaining speed, accelerating, decelerating, and merging right. However, the maneuver space may not include merging left.

At operation 204, the cooperative controller executes at least one driving maneuver for each connected vehicle according to a driving policy associated with the connected vehicle's traffic role. As will be described below, the driving policies may be refined to maximize global traffic objectives such as increasing traffic safety and efficiency.

A driving maneuver may be a controlled movement of a vehicle. For example, driving maneuvers may include longitudinal movements (e.g. accelerating, decelerating, maintaining speed, stopping, etc.), lateral movements (e.g. turning left, turning right, merging left, merging right, etc.), or any combination of the two (e.g. decelerating while merging right).

A driving policy may be one or more rules which determine which driving maneuvers will be executed for a connected vehicle based on a given traffic state. For example, in some embodiments a driving policy may be a mapping function. An example mapping function, $f_e(a; \theta_e)$, is described below. In some embodiments, this mapping function may be a trained neural network. In certain embodiments, the mapping function may be constrained by the maneuver space for its associated traffic role.

Mapping function $f_e(a; \theta_e)$ may be used to predict a next traffic state (including a likelihood of a catastrophic event such as a crash) based on a current traffic state, and trained neural network parameters. In particular, a future traffic state may be predicted by optimizing the mapping function's parameter, $\theta_e$. In some embodiments, $\theta_e$ may be optimized by minimizing the following function:

$$l = \text{RMSE\_loss} p_o + \lambda_e \text{ CrossEntropy\_loss} p_c$$

Here, $p_o(f_e(a_i; \theta_e), o_i, a_{-i})$ may predict a next traffic state, $o_i$; and $p_c(f_e(a_i; \theta_e), o_i, a_{-i})$ may predict the likelihood that maneuver, $a_i$, will lead to a catastrophic result. Accordingly, by optimizing $\theta_e$, the cooperative controller may determine which driving maneuver to take according to the driving policy and the traffic state.

As alluded to above, reinforcement learning may be used to refine the driving policy for each traffic role in a manner which maximizes global objectives for a traffic segment, such as increasing traffic safety and efficiency. Reinforcement learning is a machine learning technique which may be used to teach an agent (such as the cooperative controller) to find an optimal policy. The optimal policy will be the policy which maximizes a reward function. The reward function may be a cumulative reward for a defined time interval, or for a defined number of action/state transitions. In a typical reinforcement learning scenario, an agent (e.g. the cooperative controller) will take an action (e.g. executing a driving maneuver) which effects an environment (i.e. the traffic state of a traffic segment). Put another way, the agent's action will transition the environment from a current state to a new state. In reinforcement learning, a reward may be associated with the state transition. This reward may be tied to one or more characteristics which define what makes a policy optimal (e.g. increasing traffic safety and efficiency). The goal of the reinforcement agent is to learn a policy which maximizes the expected cumulative reward (i.e. the reward function) for a plurality of action/state transition iterations.

Accordingly, in various embodiments, the cooperative controller may receive positive rewards for taking actions (e.g. executing driving maneuvers) which transition a traffic segment to a safe traffic state. For example, successful driving intervals may be rewarded, and failed driving intervals may be punished (i.e. receive a negative reward). A successful driving interval may be a defined time interval where the cooperative controller executes one or more driving maneuvers and no catastrophic event occurs. A catastrophic event may be a crash, or in some embodiments, a dramatic driving maneuver (e.g. a rapid deceleration, or a rapid lateral movement) executed to avoid a crash. Accordingly, a failed driving interval may be a defined time interval where the cooperative controller executes one or more driving maneuvers and a catastrophic event occurs.

The cooperative controller may also receive rewards for transitioning a traffic segment to a more efficient traffic state. For example, the cooperative controller may receive a reward for transitioning a traffic segment to a traffic state with a reduced travel time. By contrast, the cooperative controller may receive a negative reward for transitioning a traffic segment to a traffic state with an increased travel time.

It should be understood that each executed driving maneuver which produces a new traffic state (and by extension generates a reward or punishment) will be a function of its associated driving policy. Each associated driving policy will be connected to traffic role assignment. Traffic role assignment itself may be a function of the traffic roles the cooperative controller defines. Thus, the rewards and punishments which the cooperative controller receives may be a function of any one, or combination of, (1) traffic role definition, (2) traffic role assignment, and (3) driving policy definition.

In summary, the goal of reinforcement learning is for an agent to learn a policy which maximizes a reward function for a plurality of actions/state transitions. Here, the goal of the cooperative controller may be to learn how to (a) define traffic roles; (b) assign connected vehicles to those traffic roles; and (c) define driving policies for those traffic roles—in a manner which maximizes a reward function.

As alluded to above, a reward framework may be designed in a manner which correlates policy objectives with the maximizing of a reward function. Here, a reward framework has been designed which correlates the objectives of increasing traffic safety and efficiency with the maximizing of a reward function. In particular, the cooperative controller is rewarded for (a) defining traffic roles; (b) assigning connected vehicles to those traffic roles; and (c) defining driving polices for those traffic roles—in a manner which (i) increases the number of successful driving intervals relative to the number of failed driving intervals (i.e. avoiding crashes and increasing traffic safety), and (ii) reduces travel time within a traffic segment (i.e. increasing traffic efficiency).

Accordingly, following the framework described above, the cooperative controller may learn to refine any one, or combination of (1) traffic role definition; (2) traffic role assignment; and (3) driving policies by finding the combination of traffic role definitions, traffic role assignments, and driving policy definitions which maximize a reward function, and by extension, optimize policy goals such as increasing traffic safety and efficiency.

Figure 3:
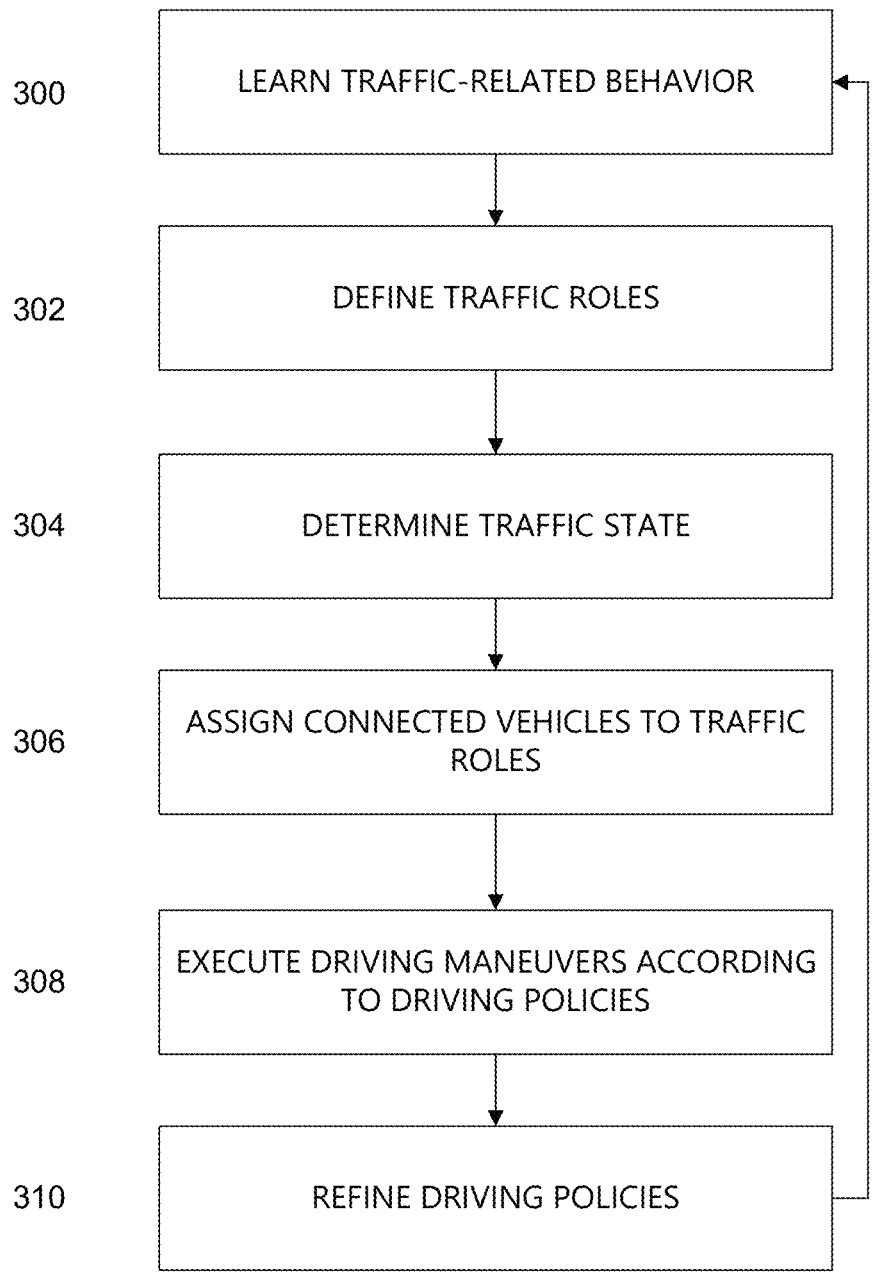
FIG. 3 is another flowchart illustrating example operations that can be performed by a cooperative controller to control one or more connected vehicles within a traffic segment.

FIG. 3 is another flowchart illustrating example operations that can be performed by a cooperative controller to control one or more connected vehicles within a traffic segment. In some embodiments, these operations may be performed by cooperative driving circuit 110. In certain embodiments, these operations may be performed repeatedly as the cooperative controller is trained using machine learning techniques.

At operation 300, the cooperative controller learns traffic-related behavior. This learned traffic-related behavior may be used to define traffic roles, and assign connected vehicles to appropriate traffic roles.

Traffic-related behavior may be behavior which relates to the movement and location of vehicles within a traffic-segment. For example, traffic-related behavior may include a tendency of cargo-trucks to maintain their speed on a highway, or travel primarily in the slow lane. Traffic-related behavior may also include the behavior of vehicles near on-ramps and exit-ramps on a highway (e.g. some vehicles may tend to speed up to pass other vehicles, while other vehicles will slow down to allow other vehicles to pass). Similarly, traffic-related behavior may include the behavior of vehicles at a particular intersection, or a busy parking lot after a football game.

As alluded to above, the cooperative controller may learn traffic-related behavior by observing traffic over a period of time. In some embodiments, this may involve observing traffic within the same traffic segment for a period of time.

At operation 302, the cooperative controller defines traffic roles based on the learned traffic-related behavior. As alluded to above, the cooperative controller may learn to cluster vehicles which behave similarly using machine learning techniques such as KNN. Over time, the cooperative controller may learn to define traffic roles for vehicles in accordance with these clusters. As described above, a traffic role may be a defined category which groups vehicles based on driving behavior. For example, there may be a traffic role for vehicles which tend to/prefer to maintain their speed on a highway. As alluded to above, by defining traffic roles, and assigning traffic roles to connected vehicles within a traffic segment, the cooperative controller may control connected vehicles in a complementary way which increases traffic safety and efficiency.

At operation 304, the cooperative controller determines a traffic state for a traffic segment. This may be performed in the same/similar manner as described in conjunction with operation 200.

At operation 306, the cooperative controller assigns a traffic role to one or more connected vehicles within the traffic segment. This may be performed in the same/similar manner as described in conjunction with operation 202.

At operation 308, the cooperative controller executes a driving maneuver for each connected vehicle according to a driving policy associated with the connected vehicle's traffic role. This may be performed in the same/similar manner as described in conjunction with operation 204.

At operation 310, the cooperative controller refines each driving policy based on reinforcement learning. This may be performed in the same/similar manner as described in conjunction with operation 204.

Figure 4:
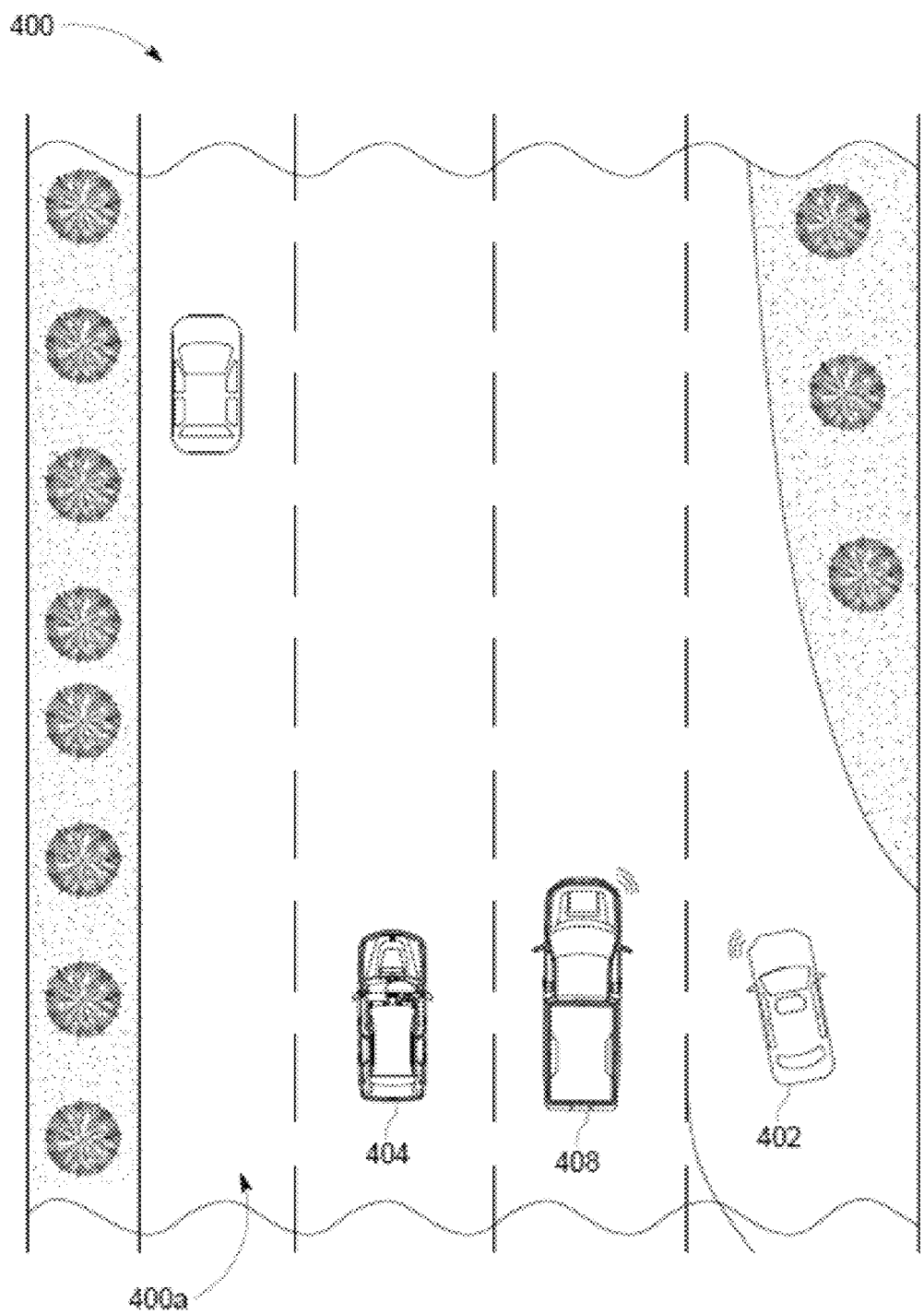
FIG. 4 is an example traffic segment, within which various embodiments may be implemented.

FIG. 4 is an example traffic segment, within which various embodiments may be implemented. In the illustrated example, the traffic segment is a stretch of highway adjacent to an on-ramp.

In the illustrated example, connected vehicle 402, a sports car, is within traffic segment 400a, and is merging onto highway 400. Connected vehicle 408, a cargo truck, is also within traffic segment 400a. It is in the right lane of highway 400. Unconnected vehicle 404 is directly adjacent to connected vehicle 408, in the middle lane of highway 400, also within traffic segment 400a.

In this scenario, the cooperative controller (which may be cloud-based, infrastructure-based, or even incorporated as an electronic control unit in one of the connected vehicles) may control both connected vehicles. As described above, the cooperative controller may do this by assigning them traffic roles based on the traffic state (e.g. the relative movement and location of the vehicles within traffic segment 400a, the priority levels of the vehicles, the configuration of highway 400, etc.). As alluded to above, depending on traffic state, the cooperative controller may assign the connected vehicles to complementary roles. Here, vehicle connected 402 is a sports car nearing the end of a merge lane. Connected vehicle 408 is immediately to its left. The driver/passenger of connected vehicle 402 may have also requested/selected a high priority level. By contrast, connected vehicle 408 is a cargo truck in the right lane of highway 400. It has unconnected vehicle 404 immediately to its left, and connected vehicle 402 immediately to its right. The priority level of connected vehicle 408 may be lower than the priority level of connected vehicle 402.

Based on these factors, the cooperative controller may assign connected vehicles 402 and 408 to different traffic roles. For example, connected vehicle 402 may be assigned to a traffic role for high-agility vehicles which are merging onto the highway with a relatively high priority level. This traffic role may have a maneuver space which includes merging left, rapid acceleration, and rapid deceleration, but not merging right, or remaining in a current lane. Accordingly, the driving policy for this traffic role may have a preference for rapid acceleration to pass slower moving vehicles. By contrast, connected vehicle 408 may be assigned to a traffic role for low agility, slow moving vehicles, which cannot easily change lanes. The traffic role may have a maneuver space which does not include rapid acceleration/deceleration or rapid lane changes. Accordingly, the driving policy for this traffic role may have a preference for maintaining a relatively slow speed, within the same lane of traffic.

Based on these driving policies, the cooperative controller may execute driving maneuvers for the two connected vehicles. Here, the cooperative controller may rapidly accelerate connected vehicle 402 to pass the truck, and merge onto highway 400. By contrast, the cooperative controller may maintain connected vehicle 408 at the same speed, or gently decelerate it, in order to allow connected vehicle 402 to pass/merge. By executing these driving maneuvers, the cooperative controller may increase the safety and efficiency of traffic segment 400a.

Figure 5:
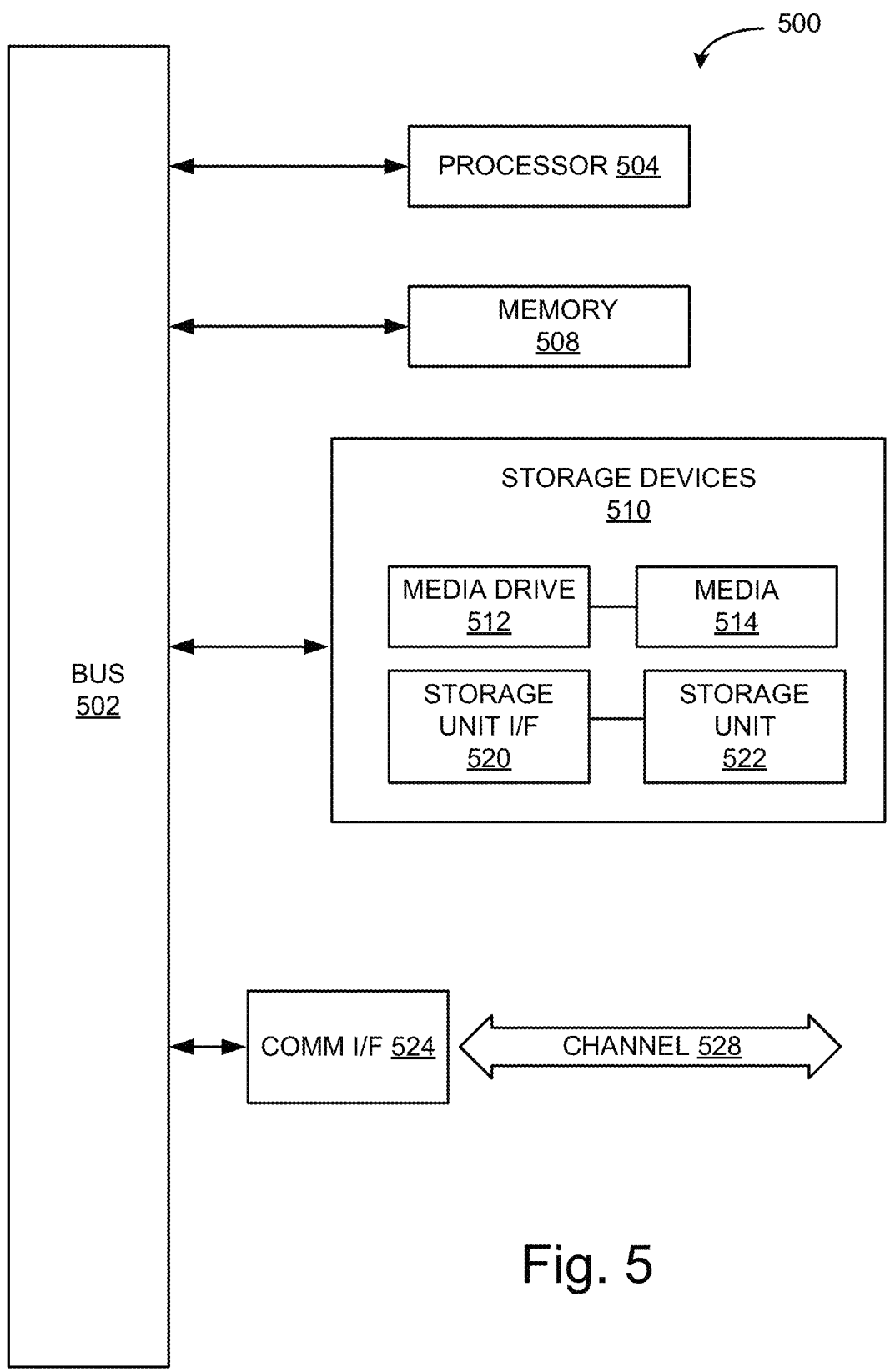
FIG. 5 depicts an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example—computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
    determining a first agility level for a first connected vehicle in a traffic segment and a second agility level for a second connected vehicle in the traffic segment;
    assigning a first traffic role to the first connected vehicle in the traffic segment based on the first agility level;
    assigning a second traffic role to the second connected vehicle based on the second agility level;
    executing, a first driving maneuver for the first connected vehicle according to a first driving policy for the first traffic role; and
    executing a second driving maneuver for the second connected vehicle according to a second driving policy for the second traffic role;
    wherein the first agility level comprises a higher agility level than the second agility level; and
    wherein the first driving maneuver involves a more rapid velocity change than the second driving maneuver.

2. The computer-implemented method of claim 1, further comprising determining a traffic state for the traffic segment, wherein the traffic state comprises location, speed, and priority level for the first and second connected vehicles, each priority level corresponding to a level of desired travel urgency for its associated connected vehicle.

3. The computer-implemented method of claim 1, further comprising, defining the first and second traffic roles by learning traffic-related behavior.

4. The computer-implemented method of claim 3, wherein, the first and second driving policies are refined using reinforcement learning.

5. The computer-implemented method of claim 4, wherein the reinforcement learning comprises maximizing a reward function involving the following rewards:
    a positive reward for decreased travel time in the traffic segment for a defined time interval;
    a positive reward for each successful driving interval;
    a negative reward for increased travel time in the traffic segment for a defined time interval; and
    a negative reward for each failed driving interval.

6. The computer-implemented method of claim 5, wherein the reward function is a cumulative reward for a defined time interval.

7. The computer-implemented method of claim 5, wherein:
    a successful driving interval is a defined time interval where one or more driving maneuvers have been executed, and no crash event has occurred within the traffic segment; and
    a failed driving interval is a defined time interval where one on or more driving maneuvers have been executed, and at least one crash event has occurred within the traffic segment.

8. The computer-implemented method of claim 1, wherein the first and second traffic roles each comprise a maneuver space associated with the traffic role, the maneuver space defining permissible driving maneuvers for a connected vehicle assigned to the traffic role.

9. The computer-implemented method of claim 8, wherein the permissible driving maneuvers comprise accelerating, decelerating, maintaining a constant speed, lane changing in a first direction, lane changing in a second direction, and stopping.

10. A system comprising:
    one or more processors; and
    memory operatively connected to the one or more processors and including computer code, that when executed by the one or more processors, causes the system to:
        use a machine learning model to group vehicles into clusters based on traffic-related behavior, wherein the traffic-related behavior for each cluster is associated with different agility levels of the vehicles;
    define one or more traffic roles based on the agility level of the vehicles;
    assign a traffic role to a connected vehicle within a traffic segment;
    execute a driving maneuver for the connected vehicle according to a driving policy associated with the connected vehicle's traffic role; and
    refine the driving policy based on reinforcement learning.

11. The system of claim 10, wherein
    the memory includes further computer code, that when executed by the one or more processors, causes the system to determine a traffic state for the traffic segment; and
    the traffic state comprises location, speed, and priority level of each vehicle within the traffic segment, each priority level corresponding to a level of desired travel urgency for its associated vehicle.

12. The system of claim 10, wherein the reinforcement learning comprises maximizing a reward function involving the following rewards:
    a positive reward for decreased travel time in the traffic segment for a defined time interval;
    a positive reward for each successful driving interval; a negative reward for increased travel time in the traffic segment for a defined time interval; and
    a negative reward for each failed driving interval.

13. The system of claim 12, wherein the reward function is a cumulative reward for a defined time interval.

14. The system of claim 12, wherein:
    a successful driving interval is a defined time interval where one or more driving maneuvers have been executed, and no crash event has occurred with the traffic segment; and
    a failed driving maneuver is a defined time interval where one on or more driving maneuvers have been executed, and at least one crash event has occurred within the traffic segment.

15. The system of claim 12, wherein assigning of traffic roles is also refined by maximizing the reward function.

16. The system of claim 10, wherein the system is cloud-based.

17. The system of claim 10, wherein the system is in one of the vehicles in the traffic segment.

18. The system of claim 10, wherein the system is in a piece of infrastructure.

19. A vehicle-comprising:
    one or more processors; and
    memory operatively connected to the one or more processors and including computer code, that when executed, causes the one or more processors to:
        use a machine learning model to group vehicles into clusters based on traffic-related behavior, wherein the traffic-related behavior for each cluster is associated with different agility levels of the vehicles;
    define one or more traffic roles based on the agility level of the vehicles;
    determine a traffic state for a traffic segment, the traffic state comprising information associated with one or more vehicles within the traffic segment;

assign a traffic role to a second vehicle within the traffic segment;
execute a driving maneuver for the second vehicle according to a driving policy associated with the second vehicle's traffic role; and
refine the driving policy based on reinforcement learning.

\* \* \* \* \*